(12) United States Patent  (10) Patent No.: US 8,485,931 B1
Whitmarsh  (45) Date of Patent: Jul. 16, 2013

(54) MULTIPLEXED FLUID CONTROL CIRCUIT

(71) Applicant: GM Global Technology Operations LLC, Detroit, MI (US)

(72) Inventor: Brian W. Whitmarsh, Commerce, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/706,400

(22) Filed: Dec. 6, 2012

(51) Int. Cl.
*F16H 3/72* (2006.01)
*F16H 48/06* (2006.01)

(52) U.S. Cl.
USPC .............................................. 475/5; 475/129

(58) Field of Classification Search
USPC ............................................. 475/5, 128, 129
See application file for complete search history.

(56) References Cited

U.S. PATENT DOCUMENTS

| | | | |
|---|---|---|---|
| 7,510,496 B2 * | 3/2009 | Long et al. | 475/123 |
| 2010/0087290 A1 * | 4/2010 | Schoenek et al. | 477/5 |
| 2011/0263370 A1 * | 10/2011 | Borntraeger et al. | 475/5 |
| 2011/0269598 A1 * | 11/2011 | Czoykowski et al. | 477/5 |

* cited by examiner

*Primary Examiner* — Edwin A Young
(74) *Attorney, Agent, or Firm* — Quinn Law Group, PLLC

(57) ABSTRACT

A vehicle includes one or more electric traction motors, an engine, a damper bypass clutch (DBC) assembly, a transmission, a fluid pump, a multiplexed fluid control circuit, and a controller. Two clutches and the DBC assembly are selectively engaged to select between eight transmission operating states. The DBC assembly selectively connects the engine to the transmission. The pump circulates fluid for cooling the motor(s) and actuating the clutches. The circuit has a variable force solenoid (VFS) and only three on/off solenoid valves. The solenoids are multiplexed together to control flow to the DBC assembly and to the clutches. The VFS valve controls line pressure to the on/off solenoids. The controller transmits signals to the VFS and to the on/off solenoid valves to select between the eight different transmission operating states. The multiplexed fluid control circuit is also disclosed herein.

18 Claims, 3 Drawing Sheets

Fig-3

| * | E | V4 P_L | 1 C1 | 2 C1B | 3 C2 | 4 C2B | 5 C1/C2 | 6 C1/C2 B | 7 C1/DBC B | 8 M_O | V3 C1 | V2 C2 | V1 C1 | V1 DBC | V1 LB |
|---|---|---|---|---|---|---|---|---|---|---|---|---|---|---|---|
| P | – |  | x | x |  |  |  |  |  |  | 1 | 0 | 0 | 0 | 1/0 |
| P | o |  | x | x |  |  |  |  |  |  | 1 | 0 | 0 | 0 | 1/0 |
| R | s |  |  |  |  |  |  |  | x |  | 0 | 0 | 1 | 1 | 1 |
| R | – |  | x | x |  |  |  |  |  |  | 1 | 0 | 0 | 0 | 1/0 |
| R | o |  | x | x |  |  |  |  |  |  | 1 | 0 | 0 | 0 | 1/0 |
| N_L | s |  |  |  |  |  |  |  | x |  | 0 | 0 | 1 | 1 | 1 |
| N_L | – |  | x | x |  |  |  |  |  |  | 1 | 0 | 0 | 0 | 1/0 |
| N_L | o |  | x | x |  |  |  |  |  |  | 1 | 0 | 0 | 0 | 1/0 |
| N_H | s |  |  |  |  |  |  |  | x |  | 0 | 0 | 1 | 1 | 1 |
| N_H | – |  |  |  | x | x |  |  |  |  | 0 | 1 | 0 | 0 | 1/0 |
| N_H | o |  |  |  | x | x |  |  |  |  | 0 | 1 | 0 | 0 | 1/0 |
| M_1 | – |  | x | x |  |  |  |  |  |  | 1 | 0 | 0 | 0 | 1/0 |
| M_1 | o |  |  |  | x | x |  |  |  |  | 0 | 1 | 0 | 0 | 1/0 |
| M_1 | s |  |  |  |  |  | x |  |  |  | 1 | 0 | 0 | 0 | 1 |
| FG | o |  |  |  |  |  |  | x |  |  | 1 | 1 | 0 | 0 | 1/0 |
| M_2 | o |  |  |  | x |  |  |  |  |  | 0 | 1 | 0 | 0 | 1/0 |
| M_0 | o |  |  |  |  |  |  |  |  | x | 0 | 0 | 0 | 0 | 0 |

| V2 | V3 | V1 |
|---|---|---|
| 0 | 0 | 0 |
| 0 | 0 | 1 |
| 1 | 1 | 1 |
| 1 | 1 | 0 |
| 1 | 0 | 0 |
| 0 | 0 | 0 |
| 1 | 0 | 1 |
| 1 | 1 | 0 |

MULTIPLEXED FLUID CONTROL CIRCUIT

TECHNICAL FIELD

The present disclosure relates to a multiplexed fluid control circuit.

BACKGROUND

A hybrid transmission includes one or more electric traction motors, an engine, and various planetary gear sets. A controller adjusts torque from the engine and/or one or both traction motors in response to changing hybrid control requirements. Hydraulic fluid is provided via a fluid circuit to actuate clutches within the transmission, as well as to cool the windings of the traction motors. However, conventional fluid circuit design may be less than optimal for certain hybrid transmission configurations.

SUMMARY

A vehicle is disclosed herein that includes a multiplexed fluid control circuit. The circuit controls two clutches (C1 and C2) and a damper bypass clutch (DBC) while independently providing a lube boost function. This is accomplished using just three on/off solenoids that are multiplexed together as set forth herein.

In a conventional configuration, a 2-mode hybrid transmission uses two different on/off solenoid valves in conjunction with a shift solenoid valve to control the C1 and C2 clutches, respectively. The DBC is controlled via a third on/off solenoid valve, while the fourth on/off solenoid valve provides the lube boost function. This controls ten different states. The present approach identifies two states that are underutilized and eliminates them, and multiplexes the on/off solenoid valves to control the remaining eight states.

In particular, a vehicle is disclosed herein that, in an embodiment, includes an electric traction motor, an engine having an output shaft, a damper bypass clutch (DBC) assembly, a transmission, a fluid pump, and a multiplexed fluid control circuit. The DBC assembly is connected to the output shaft. The transmission includes first and second clutches, which along with the DBC assembly are selectively engaged and disengaged to select between only eight transmission operating states. The fluid pump that circulates fluid for cooling the motor and for actuating the clutches.

The multiplexed fluid control circuit has a variable force solenoid (VFS) and only three on/off solenoids, including first, second, and third on/off solenoids. The three on/off solenoids are multiplexed together to control a flow of the fluid to the DBC assembly and to the first and second clutches. The VFS valve is operable to control line pressure to the on/off solenoids. The controller, which is in communication with the multiplexed fluid control circuit, transmits signals to the VFS valve and to the on/off solenoid valves to select between the eight different transmission operating states.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 3 is a table describing various states of the transmission of FIG. 1, as well as solenoid and clutch states used to enact the various transmission states.

DETAILED DESCRIPTION

Figure 1:
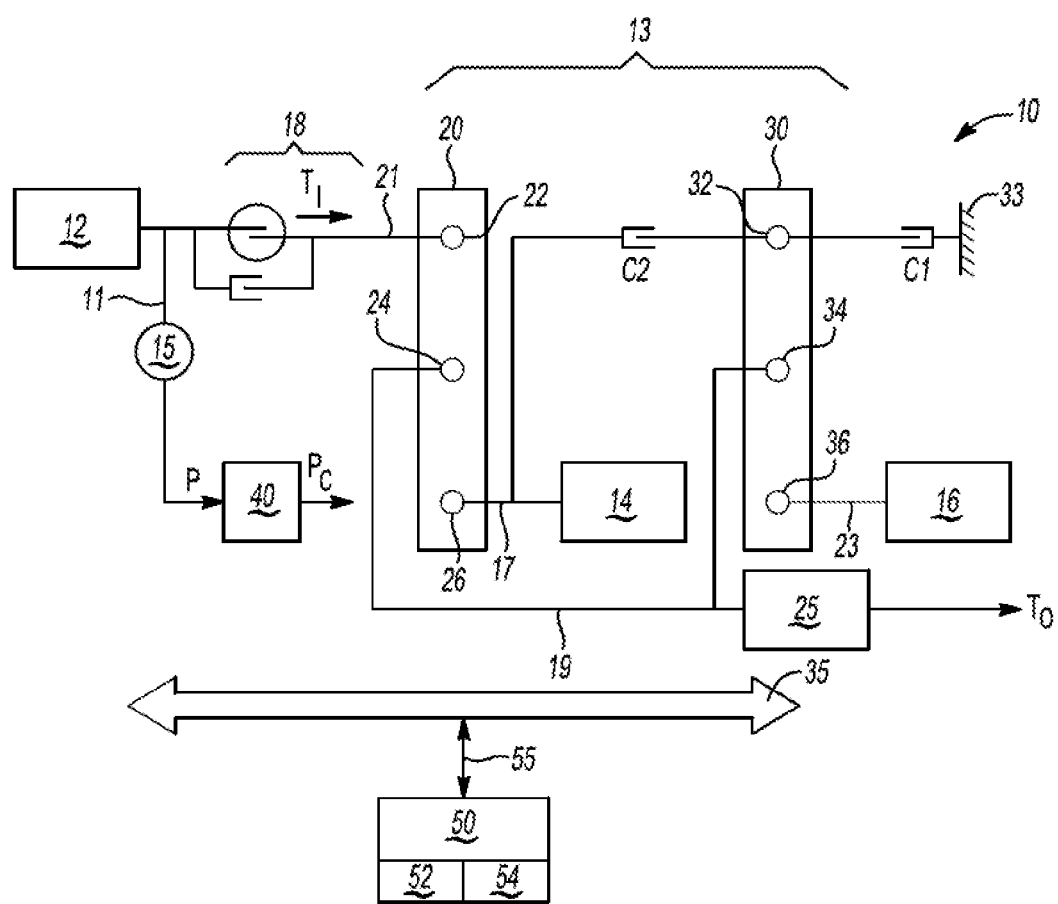
FIG. 1 is a schematic illustration of a vehicle having a multiplexed fluid circuit as described herein.
Figure 2:
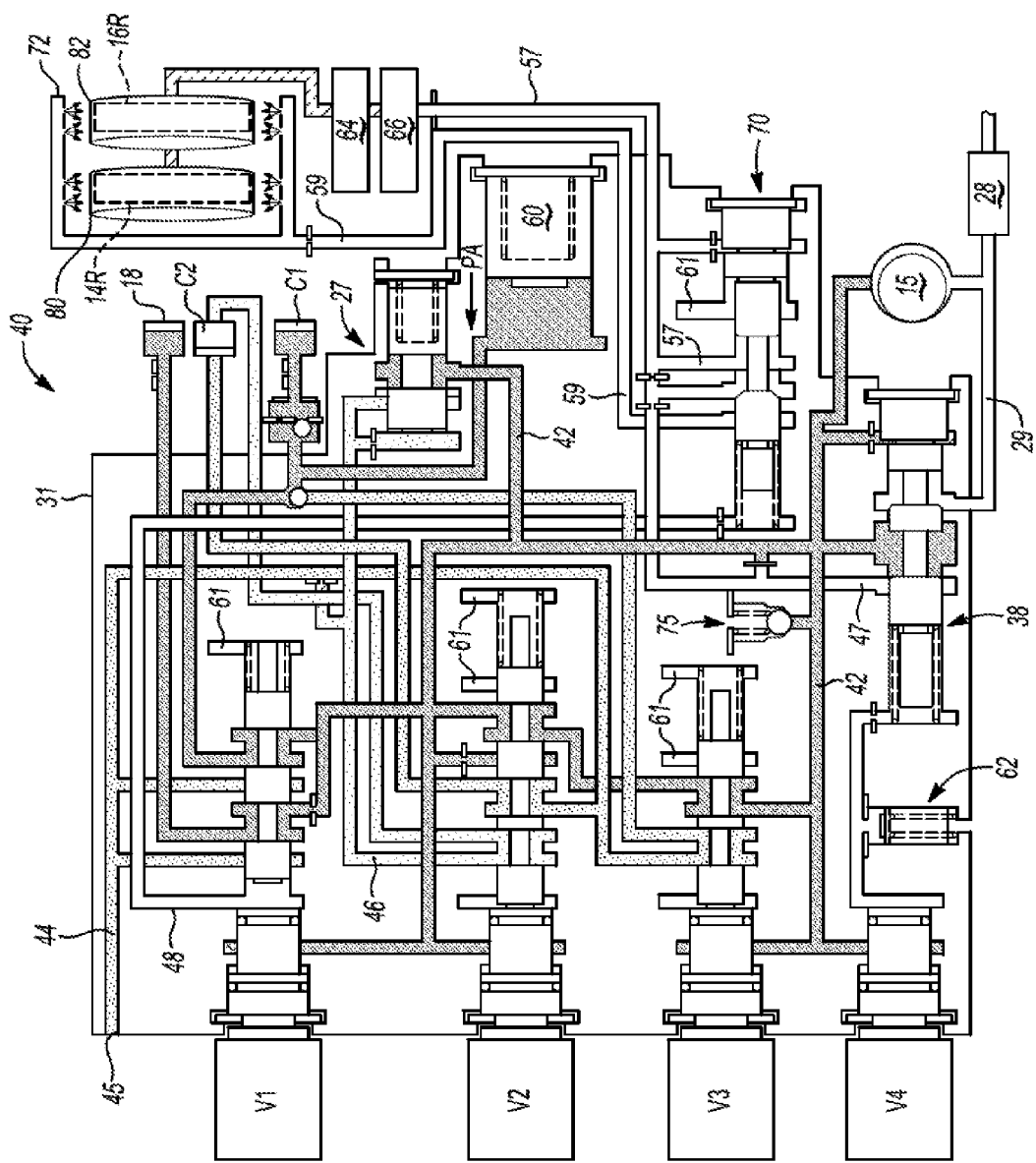
FIG. 2 is a schematic illustration of a multiplexed fluid circuit usable with the vehicle shown in FIG. 1.

Referring to the drawings, an example vehicle 10 is shown schematically in FIG. 1 having an internal combustion engine 12 and a transmission 13. The transmission 13 may be embodied as a hybrid transmission having eight distinct transmission states as described below with reference to FIG. 3. The transmission 13 receives fluid pressure (arrow P) into a multiplexed fluid control circuit 40, an example of which is shown in FIG. 2. Circuit 40 enables the use of fewer components, and thus reduced weight and packaging space, while allowing all eight transmission states to be effectively executed as needed in any overall shift control scheme.

The transmission 13 of FIG. 1 may include first and second planetary gear sets 20 and 30 as shown, as well as respective first and second motor/generator units (MGUs) 14 and 16. The engine 12 delivers input torque ($T_I$) to the first planetary gear set 20 through a damper bypass clutch (DBC) assembly 18 in the embodiment shown in FIG. 1. The particular example shown in FIG. 1 provides just one possible powertrain design for a hybrid electric vehicle, in this instance providing a two-mode hybrid powertrain.

A fluid pump 15 is driven by the engine 12 and/or a separate pump motor (not shown) via a rotatable drive member 11, e.g., a cam shaft, to thereby circulate fluid to the multiplexed fluid control circuit 40. Circuit 40 uses a multiplexed valve configuration to supply clutch pressure (arrow $P_C$) to different fluid powered components of the vehicle 10, including for instance the DBC assembly 18, a first clutch C1, and a second clutch C2. Circuit 40 may also provide cooling and lubrication flow to the respective first and second MGUs 14 and 16, such as to the coils or windings of the rotor and stator of each MGU 14 and 16.

The vehicle 10 of FIG. 1 may also include a controller 50. The controller 50 executes instructions stored on a tangible, non-transitory memory device 52 in order to automatically select between eight different transmission operating states. The controller 50, shown schematically in FIG. 1, may be configured as a digital computer having, in addition to the memory device 52, e.g., read only memory (ROM), flash memory, or other magnetic or optical storage media, a processor 54 and any required amount of transitory memory such as random access memory (RAM) and electrically-erasable programmable read only memory (EEPROM). The controller 50 may also include a high-speed clock, analog-to-digital (A/D) and digital-to-analog (D/A) circuitry, and input/output circuitry and devices (I/O), as well as appropriate signal conditioning and buffer circuitry. The controller 50 may communicate with the multiplexed fluid control circuit 40 via a communications bus, e.g., a controller area network (CAN) bus 35 as shown, and therefore the controller 50 is able to transmit any required output signals (arrow 55) in controlling the various clutch states of the transmission 13.

In the example embodiment shown in FIG. 1, the first planetary gear set 20 includes first, second, and third nodes 22, 24, and 26, respectively. An input member 21 is connected to the first node 22, e.g., a ring gear, and receives the input torque (arrow $T_I$) from the engine 12 via the DBC assembly 18. An interconnecting member 19 connects the second node 24, e.g., a planetary carrier, to a final drive assembly 25, which then delivers output torque (arrow $T_O$) to a set of drive wheels (not shown). The third node 26, e.g., a sun gear, may be connected to a motor output shaft 17 of the first MGU 14.

The second planetary gear set 30 likewise includes respective first, second, and third nodes 32, 34, and 36. The second clutch C2, which is a rotating clutch, connects the third node 26 of the first planetary gear set 20 to the first node 32 of the second planetary gear set 30. The first node 32 is also grounded to a stationary member 33 of the transmission via the first clutch C1, i.e., a brake. The second nodes 24, 34 of the respective first and second planetary gear sets 20 and 30 are connected via interconnecting member 19 as shown. A motor output shaft 23 of the second MGU 16 is connected to the third node 36. Thus, motor output torque from the MGUs 14 and 16 is selectively used, alone or in conjunction with torque from the engine 12, to power the transmission 13 in some of the eight transmission operating states described below with reference to FIG. 3.

Referring to FIG. 2, the multiplexed fluid control circuit 40 is multiplexed in order to control eight different transmission operating states with just three on/off solenoids. In the particular embodiment of FIG. 2, circuit 40 includes a valve body 31 containing or connected to respective first, second, and third on/off solenoid valves V1, V2, and V3. Circuit 40 also includes a variable force solenoid (VFS) valve V4.

In particular, the three on/off solenoid valves V1-V3 and the VFS valve V4 are multiplexed together to provide the required functionality for the eight transmission operating states noted above. The first on/off solenoid valve V1 may act as a shift solenoid for clutch C1. Additionally, valve V1 provides fluid pressure to the DBC assembly 18 and controls what is referred to hereinafter as a "lube boost" state. This state is described in more detail below with reference to FIG. 3. The second on/off solenoid valve V2 acts at all times as the C2 shift solenoid, and thus controls the delivery of fluid pressure to the second clutch C2. The third on/off solenoid valve V3 may act as the C1 shift solenoid, either alone or in conjunction with the first on/off solenoid valve V1. The VFS valve V4 provides overall control over line pressure (arrow $P_L$) within circuit 40.

The valve body 31 shown in FIG. 2 defines a plurality of different internal flow channels. Exhaust ports 61 are provided for valves V1-V3, with the exhaust ports 61 shown truncated for illustrative simplicity. As understood in the art, each exhaust port 61 leads back to a fluid sump (now shown). Also, while more than seven flow channels are shown, the flow channels can be simplified to seven main flow channels based on their respective functions. That is, each listed "flow channel" may include multiple flow paths, legs, or branches each collectively serving the same function.

The multiplexed fluid control circuit 40 includes a first flow channel 42 carrying line pressure through the circuit 40. First flow channel 42 carries fluid from the fluid pump 15 to the VFS valve V4 via a pressure regulating valve (PRV) 38. The fluid pump 15 draws fluid from a sump (not shown), preferably through a sump filter 28. A damper 62 may be disposed between the VFS valve V4 and the PRV 38 to help dampen pressure pulsations as the PRV 38 regulates the line pressure ($P_L$). A suction line 29 is in fluid communication with the PRV 38 and leads back to the inlet of the fluid pump 15 sump as shown. The VFS valve V4 ultimately delivers fluid at line pressure ($P_L$) to valves V1-V3 via branches or legs of the first flow channel 42. The first flow channel 42 may include a pressure relief valve 75. The VFS valve V4 ultimately controls the position of the PRV 38 so that the PRV 38 can provide flow for cooling, as noted below.

A second flow channel 44 defines an elevated exhaust port 45 back to the sump (not shown). The term "elevated" refers to the relative position of the exhaust port 45 with respect to the sump when the valve body 31 is installed in the vehicle 10 of FIG. 1. The second flow path 44 provides an exhaust backfill flow path for any fluid exhausted from the clutches C1, C2 through the various valves that are controlled by the on/off solenoids V1-V3.

A third flow channel 46 provides fluid pressure from a compensator feed valve 27 to clutch C2 through the second on/off solenoid valve V2 as shown. The compensator feed valve 27 regulates pressure to a compensator of clutch C2. As is known in the art, a compensator is a sealed volume on the release side of a clutch piston. Typically, rotating clutches such as C2 are not ever completely exhausted of fluid. At high rotational speeds, trapped fluid on the apply side of a clutch piston could develop pressure due to centripetal force, which could be sufficient to apply the clutch when apply is not desired. To counteract this, fluid is intentionally pumped into the release side of the piston to compensate or "balance" pressure on the apply side such that a net force is not developed to move the piston into its apply state. When a clutch is applied, its compensator is exhausted, e.g., through on/off solenoid valve V2 into the second fluid channel 44.

Still referring to FIG. 2, a fourth flow channel 48 provides fluid pressure to a lube regulator valve assembly 70 from the first on/off solenoid valve V1. The lube regulator valve assembly 70 receives fluid for cooling and lubrication from the PRV 38 via a fifth flow channel 47. Thus, fluid for lubrication and cooling is provided via the PRV 38 to the fifth flow channel 47 and to the lube regulator valve assembly 70. The lube regulator valve assembly 70 serves various functions. One function is the feed of fluid via a sixth flow channel 59 to a spray device 72, e.g., spray bars or nozzles, which in turn directs fluid onto the stators 80, 82 of the first and second MGUs 14 and 16 of FIG. 1, respectively. Another function is the feed of cooling fluid to the rotors 14R, 16R of the first and second MGUs 14, 16 of FIG. 1 via a seventh flow channel 57. Fluid passing through the seventh flow channel 57 may pass through a heat exchanger 66 and a gearbox 64 of the transmission 13 shown in FIG. 1 before ultimately reaching and cooling the rotors 14R, 16R. While not shown for illustrative simplicity, fluid can then return to the sump via gravity and any required return lines.

In the multiplexed fluid control circuit 40 of FIG. 2, clutch C2 is fed via the second on/off solenoid valve V2 through the third flow channel 46, and therefore valve V2 acts as the C2 shift solenoid in the fluid circuit 40 shown in FIG. 2. The DBC assembly 18 is fed solely via the first on/off solenoid valve V1. Thus, valve V1 acts as the sole shift solenoid for the DBC assembly 18 in the illustrated configuration. Clutch C1 is also fed by valve V1, and, as needed, by fluid pressure ($P_A$) from an accumulator 60. In this manner, valve V1 also acts as a shift solenoid for clutch C1.

Additionally, the fluid connection between valve V1 and the lube regulator valve assembly 70, i.e., the fourth flow channel 48, also enables valve V1 to act in a "lube boost" capacity. That is, as additional lubrication is required for the gearbox 64, the rotors 14R, 16R of the respective first and second MGUs 14 and 16, or other components, valve V1 may bias the lube regulator valve assembly 70 to provide a higher pressure to the seventh flow channel 57. The lube boost state and the remaining transmission operating states are described in more detail below with reference to FIG. 3.

Referring to FIG. 3, a logic chart is shown for control of the three on/off solenoids V1-V3 of FIG. 2, along with the VFS solenoid V4, in establishing one of eight different transmission operating states. The normal states (column *) of the transmission 13 of FIG. 1 includes park (P), reverse (R), neutral low ($N_L$), neutral high ($N_H$), Mode 1 ($M_1$), fixed gear (FG), mode 2 ($M_2$), and mode 0 ($M_O$). The engine (E) state corresponding to each of the normal states (column *) includes "engine off" (–), "engine on" (O), and "start" (S), with the latter describing an active restart of the engine 12 shown in FIG. 1. The next column (V4) indicates that the VFS valve V4 of FIG. 2 provides regulated line pressure ($P_L$*) in all states.

Columns 1-8 describe eight different transmission operating states controlled using just three on/off solenoid valves, i.e., valves V1-V3. The required clutch states are shown for each state 1-8, with X representing an engaged clutch and no entry representing a disengaged clutch. In states 2, 4, 6, and 7, the presence of the letter B indicates a lube boost state. In column V1, lube boost is abbreviated as LB. The remaining columns indicate the state of valves V1-V3 for the corresponding clutch states, wherein a 1 indicates an on/open state of the valve and 0 indicates an off/closed state for a normally closed valve, i.e., a commanded on state allows the valve to feed the corresponding clutch C1, C2, or DBC.

The use of the present multiplexed design thus allows a reduction in the number of on/off solenoids relative to conventional approaches. For instance, only three on/off solenoid valves, i.e., V1-V3 as shown in FIG. 2, are used to control the required eight states of the transmission 13 shown in FIG. 1. The present multiplexed fluid control circuit 40 of FIG. 2 thus simplifies any required valve control logic while also reducing cost, weight, and packaging space.

While the best modes for carrying out the invention have been described in detail, those familiar with the art to which this invention relates will recognize various alternative designs and embodiments for practicing the invention within the scope of the appended claims.

The invention claimed is:
1. A vehicle comprising:
an electric traction motor;
an engine having an output shaft;
a damper bypass clutch (DBC) assembly connected to the output shaft;
a transmission having first and second clutches, wherein the clutches and the DBC assembly are selectively engaged and disengaged to select between only eight transmission operating states, and wherein the DBC assembly selectively connects the output shaft to the transmission;
a fluid pump that circulates fluid for cooling the motor and for actuating the clutches;
a multiplexed fluid control circuit having a variable force solenoid (VFS) and three on/off solenoid valves, including first, second, and third on/off solenoid valves, wherein the three on/off solenoid valves are multiplexed together to control flow of the fluid to the DBC assembly and to the first and second clutches, and wherein the VFS valve is operable to control line pressure to the on/off solenoids; and
a controller in communication with the multiplexed fluid control circuit, wherein the controller transmits signals to the VFS solenoid and to the on/off solenoid valves to thereby select between the eight different transmission operating states.

2. The vehicle of claim 1, wherein:
the transmission includes a stationary member and first and second planetary gear sets;
each planetary gear set has first, second, and third nodes;
the first clutch is connected to the first node of the second gear set; and
the second clutch is connected between the third node of the first gear set and the first node of the second gear set.

3. The vehicle of claim 2, wherein the traction motor includes first and second traction motors that are respectively connected to the third nodes of the first and second gear sets, and wherein the engine is selectively connected to the first node of the first gear set via the DBC assembly.

4. The vehicle of claim 1, wherein the first on/off solenoid valve feeds fluid pressure to the DBC assembly and the first clutch, the second on/off solenoid valve feeds fluid pressure to the second clutch, and the third on/off solenoid valve feeds fluid pressure to the first clutch.

5. The vehicle of claim 1, further comprising a spray device that is positioned adjacent to the electric traction motor, wherein fluid from the VFS valve is fed onto stator windings of the electric traction motor via the spray bar.

6. The vehicle of claim 1, wherein the fluid circuit includes a hydraulic accumulator in fluid communication with the first clutch.

7. The vehicle of claim 1, wherein the first and third on/off solenoid valves are operable as shift solenoids for the first clutch, and wherein the second on/off solenoid valve is the sole shift solenoid for the second clutch.

8. The vehicle of claim 7, wherein the eight transmission operating states include a plurality of lube boost states in which the first on/off solenoid valve is controlled to deliver fluid to the transmission regardless of the engagement state of the first clutch.

9. The vehicle of claim 1, further comprising a pressure regulating valve, wherein the multiplexed fluid control circuit includes a flow channel that carries fluid from the fluid pump to the VFS valve via the pressure regulating valve.

10. The vehicle of claim 9, wherein the multiplexed fluid control circuit includes a lube regulator valve assembly and defines a flow channel that provides fluid pressure to the lube regulator valve assembly from the first on/off solenoid valve.

11. The vehicle of claim 9, further comprising a heat exchanger, wherein the lube regulator valve assembly feeds cooling fluid to a rotor of the electric traction motor via the heat exchanger.

12. A multiplexed fluid control circuit for a vehicle transmission having a damper bypass clutch (DBC assembly) and first and second clutches that are selectively engaged and disengaged to select between eight transmission operating states of the transmission, the multiplexed fluid control circuit comprising:
a first, second, and third on/off solenoid valve that are multiplexed together to control a flow of fluid from a fluid pump to the DBC assembly and to the first and second clutches; and
a variable force solenoid (VFS) operable to control line pressure to the on/off solenoids;
wherein the first, second, and third on/off solenoid valves and the VFS valve are in communication with a controller and are configured to receive signals transmitted from the controller to thereby select between the eight different transmission operating states.

13. The multiplexed fluid control circuit of claim 12, wherein the first on/off solenoid valve feeds fluid pressure to the DBC assembly and the first clutch, the second on/off solenoid valve feeds fluid pressure to the second clutch, and the third on/off solenoid valve feeds fluid pressure to the first clutch.

14. The multiplexed fluid control circuit of claim 12, wherein the multiplexed fluid control circuit includes a hydraulic accumulator in fluid communication with the first clutch.

15. The multiplexed fluid control circuit of claim 12, wherein the first and third on/off solenoid valves are operable as shift solenoids for the first clutch, and wherein the second on/off solenoid valve is the sole shift solenoid for the second clutch.

16. The multiplexed fluid control circuit of claim 12, wherein the eight transmission operating states include a plurality of lube boost states in which the first on/off solenoid valve is controlled to deliver fluid to the transmission regardless of the engagement state of the first clutch.

17. The multiplexed fluid control circuit of claim 12, further comprising a pressure regulating valve, wherein the multiplexed fluid control circuit includes a flow channel that carries fluid from the fluid pump to the VFS valve via the pressure regulating valve.

18. The multiplexed fluid control circuit of claim 12, wherein the multiplexed fluid control circuit includes a lube regulator valve assembly and defines a flow channel that provides fluid pressure to the lube regulator valve assembly from the first on/off solenoid valve.

\* \* \* \* \*